(12) United States Patent
Cerwinski et al.

(10) Patent No.: US 8,751,847 B2
(45) Date of Patent: Jun. 10, 2014

(54) METHOD AND SYSTEM FOR DETECTING WHETHER A COMPUTER SERVER HAS SHUT DOWN GRACEFULLY

(75) Inventors: James Cerwinski, Red Bank, NJ (US); Steven Hilton, Raleigh, NC (US); Trent Albright, Apex, NC (US)

(73) Assignee: Raritan Americas, Inc., Somerset, NJ (US)

( * ) Notice: Subject to any disclaimer, the term of this patent is extended or adjusted under 35 U.S.C. 154(b) by 139 days.

(21) Appl. No.: 13/269,867

(22) Filed: Oct. 10, 2011

(65) Prior Publication Data

US 2012/0173911 A1 Jul. 5, 2012

Related U.S. Application Data

(60) Provisional application No. 61/391,453, filed on Oct. 8, 2010.

(51) Int. Cl.
*G06F 1/30* (2006.01)
*G06F 1/28* (2006.01)

(52) U.S. Cl.
USPC ............................ 713/340; 713/310; 713/330

(58) Field of Classification Search
CPC ........... Y02B 60/1278; Y02B 60/1282; Y02B 60/1296; G06F 1/3203; G06F 1/3209; G06F 1/3246; G06F 1/3287

USPC ......... 713/323, 324, 340, 300, 310, 320, 330; 709/220, 224
See application file for complete search history.

(56) References Cited

U.S. PATENT DOCUMENTS

| | | | | |
|---|---|---|---|---|
| 5,675,723 A * | 10/1997 | Ekrot et al. | ..................... | 714/4.3 |
| 5,918,059 A * | 6/1999 | Tavallaei et al. | .............. | 713/300 |
| 7,240,222 B1 * | 7/2007 | Falik et al. | ..................... | 713/300 |
| 2003/0033546 A1* | 2/2003 | Bresniker et al. | ............. | 713/300 |
| 2004/0064743 A1* | 4/2004 | Bolian et al. | .................. | 713/300 |

* cited by examiner

*Primary Examiner* — Glenn A Auve
(74) *Attorney, Agent, or Firm* — Mark H. Jay

(57) ABSTRACT

A server in a data center is supplied with power by a power distribution unit ("PDU") having outlet-level power monitoring and switching capability. A predetermined server-specific time after a shutdown command has been issued to the server, the level of power consumption of the server is compared with a predetermined server-specific level of power consumption. If the level of power consumption of the server at that time is less than the server-specific level of power consumption, the server is considered to have been gracefully shut down and power to the server is switched off by delivering an appropriate command to the PDU. If the level of power consumption of the server at that time is not less than the server-specific level of consumption, this indicates a malfunction and power to the server is maintained so the cause can be determined and remedied without unnecessarily corrupting data or damaging the server.

12 Claims, 5 Drawing Sheets

METHOD AND SYSTEM FOR DETECTING WHETHER A COMPUTER SERVER HAS SHUT DOWN GRACEFULLY

PRIORITY CLAIM

Applicants claim 35 U.S.C. §119(e) priority of provisional application No. 61/391,453 filed Oct. 8, 2010.

BACKGROUND OF THE INVENTION

The invention relates to power monitoring systems, and more particularly relates to power monitoring systems for use in data centers. In its most immediate sense, the invention relates to power monitoring systems for use in data centers utilizing power distribution units having outlet-level power monitoring and switching capabilities.

Large-scale computer operations are commonly carried out in data centers. A data center is a facility wherein computing tasks are parceled out for execution by a multiplicity— sometimes thousands—of servers (together with related equipment such as modems and routers). Conventionally, such data processing equipment is mounted in racks and supplied with power by power distribution units ("PDUs").

A PDU is supplied with line power and distributes it to a plurality of electronic devices (conventionally, a plurality of data processing devices mounted in a rack or a computer cabinet to which the PDU is also mounted). A PDU has a plurality (often ten or twenty) female line-voltage receptacles for supplying power to e.g. servers, modems, routers etc. that are mounted in the rack or cabinet to which the PDU is attached. Modern PDUs such as those made by Raritan Inc. can monitor the power drawn from each receptacle (i.e. have "outlet level" power monitoring), thereby making it possible to e.g. determine the power being drawn by a particular modem or a computer server. Modern PDUs can also turn individual receptacles on and off (i.e. have "outlet level" switching capability) in response to instructions, thereby powering and depowering the equipment that is plugged into those receptacles.

Modern data centers use large quantities of electrical power to power the servers. Electrical power is costly, and operators of data centers seek to reduce any waste of it. Operators therefore try to shut down power to servers that are not needed to cope with the available workload. This has been done by using networked PDUs with outlet-level power monitoring capability and individual outlet switching (such as those manufactured by Raritan Inc.) to supply power to the servers, and using computer programs such as Raritan Inc.'s POWER IQ product to appropriately control the servers and PDUs.

Significantly, because a server's power supply continues to operate ever after the server has been shut down, the only way to entirely reduce the energy consumption of a server is to cut off its supply of electrical power. In order to do this in an acceptable manner, two events must occur in sequence. The first event is the server's execution of a "graceful shutdown" and the second event is the cutoff of power to the server. This will now be discussed in order.

During a graceful shutdown, a server terminates its operations in an orderly manner (i.e. such that currently running computer processes save all volatile data and close themselves only after this has taken place) and prevents new computer processes from starting. A graceful shutdown is initiated by delivering a shutdown command to the server that is to be shut down. (As used herein, the term "shutdown command" refers to a command to shut a server down normally. It is alternatively possible to command a server to execute a forced or abortive shutdown, but this is disfavored as will be discussed below.) Once a server has shut down gracefully, it has ceased to operate, but it still consumes power because its power supply remains energized. That is why the second event—switching off power to the server—is necessary.

When a server has been shut down gracefully after receipt of a shutdown command, switching off the power to the server does not corrupt ongoing computer processes, and does not interfere with the ability to restart the server by switching the power on and bringing the server back on-line with proper functionality. However, a graceful shutdown is not assured; various errors can prevent it from taking place. For example, a computer process may "hang" after the server has received a shutdown command. When this happens, the server is in a state in which switching off the power to the server (i.e. shutting it down abortively) will almost certainly have undesirable consequences (e.g. data corruption). In the worst case, turning off the power to a hung server can cause the server to become unbootable and therefore incapable of being brought back on-line without substantial repair. Alternatively, the server may reject the shutdown command as unauthorized (a so-called "authentication error"), the computer network may malfunction and fail to deliver the shutdown command to the server, or another error condition may exist. Where these or other error conditions are present, line power to the server should not be switched off because this will cause data corruption that might be avoidable by identification and repair of the condition causing the malfunction.

It would be advantageous to provide a power monitoring method and apparatus for use in data centers utilizing power distribution units having outlet-level power monitoring and switching capabilities that would identify whether a server has actually executed a graceful shutdown after receiving a shutdown command, that would switch off the power to the server if such a graceful shutdown has taken place, and that would keep the server connected to line power in the presence of predetermined error conditions.

SUMMARY OF THE INVENTION

In accordance with the invention, there is provided a method and system that enables an operator to determine whether a server has in fact shut down gracefully after issuance to it of a shutdown command. The shutdown command can be issued by a power monitoring program, or by an operator.

In accordance with the invention, for each server to be shut down there is predetermined:

a level of power consumption below which the server is considered to have been gracefully shut down; and a maximum time duration required for the server to shut down gracefully after receiving a shutdown command.

In further accordance with the invention, the power consumption of the server is monitored, as is the time elapsed since issuance of a shutdown command to the server. Immediately after this predetermined time duration has taken place, the power consumption of the server is compared with the predetermined level of power consumption.

If the power actually consumed by the server at the time of comparison is below the predetermined level of power consumption, the server is considered to have shut down gracefully and line power to the server can be switched off without adverse consequences. But, if the power actually consumed by the server at the time of comparison is equal to or greater than the predetermined level of power consumption, an error condition (e.g. a hung server) is determined to exist and line power to the server will be maintained. Advantageously, the type of error and the server(s) affected are logged so the operator can determine the best way to make repairs.

Most commonly, an operator will predetermine which servers are to be shut down and when. (For example, the operator may define groups of servers that are to be shut down at the end of the work week or before holidays, and shutdown commands will then be issued to the designated servers at the designated times.) However, it is alternatively possible that the servers to be shut down and the times that they are to be shut down will be determined algorithmically based on additional factors (e.g. power consumption). The conditions that govern issuance of shutdown commands to particular servers are not part of the invention.

Advantageously, and in accordance with the preferred embodiment, power consumption of the server is monitored using a PDU having outlet-level power monitoring and switching capability. The PDU may be connected to an in-band network or to an out-of-band network.

BRIEF DESCRIPTION OF THE DRAWINGS

The invention will be better understood with reference to the following illustrative and non-limiting drawings, in which.

DETAILED DESCRIPTION OF PREFERRED EMBODIMENTS

Figure 1:
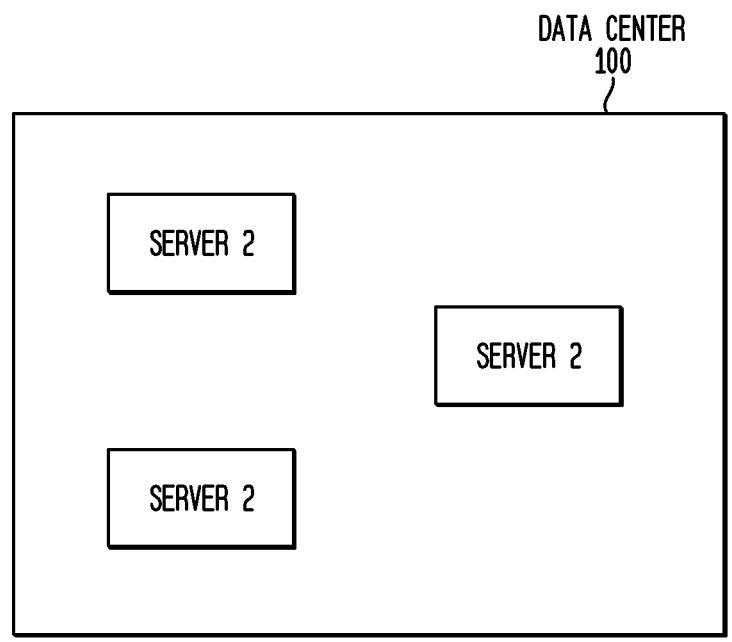
FIG. 1 schematically illustrates a data center having a plurality of servers.

For simplicity, the following description shows only six servers in a data center in which the invention has been installed and is operating. In fact, data centers routinely contain thousands of servers. The number of servers in the data center is not part of the invention. Additionally, the following description does not specify the details of the network(s) used in the data center. Networks are well-known and persons skilled in the art will be able to construct network(s) appropriate to the intended application. Furthermore, the same element is always indicated using the same reference numeral, and corresponding elements in different embodiments are indicated using primed reference numerals.

A plurality of servers 2 are operated in a data center 100 (FIG. 1). (The servers 2 need not be identical and need not all share the same operating system.) For purposes of illustration, it will be assumed that the power consumption of a server 2 having a 100 watt power supply in a data center 100 will be on the order of 50-60 watts while carrying out a computer operation, 15-20 watts while idling (i.e. while awaiting a command to perform a computer operation), and 5-10 watts after having shut down gracefully. (The server 2 consumes power after having shut down gracefully because the power supply continues to draw current.) It will also be assumed that if the server 2 receives a shutdown command, it typically takes 3-15 minutes to shut down gracefully.

Figure 2:
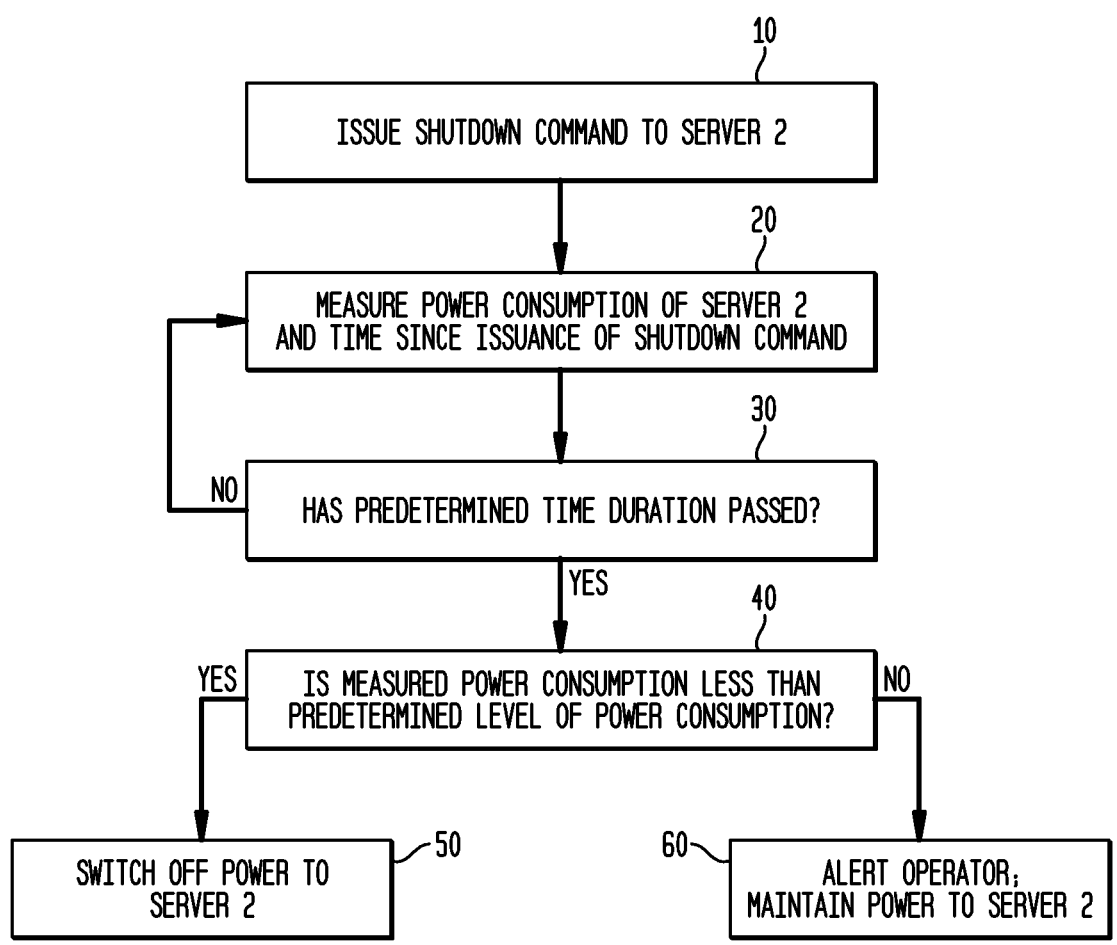
FIG. 2 is a flow chart of a preferred embodiment of a method in accordance with the invention.

The invention proceeds from a realization that a server that has executed a graceful shutdown will consume power at a reduced rate. Therefore, in accordance with a first preferred embodiment of a method in accordance with the invention (FIG. 2), let it be assumed that a shutdown command is issued to the server 2 in a first step 10. (The details of such issuance will be discussed below.) In a second step 20, issuance of the shutdown command starts a timer (not shown). When the timer has measured the passage of a predetermined maximum time duration (15 minutes, in this instance) (step 30) the power consumption of the server 2 is compared (step 40) with a predetermined level of power consumption (10 watts, in this instance). If the measured power consumption of the server 2 is less than this, it is assumed that the server 2 has shut down gracefully, and power to the server 2 can then be turned off in step 50. If the measured power consumption of the server 2 is not less than this predetermined level of power consumption, the server 2 is assumed to be hung or to be affected by another error and the operator of the data center 100 is accordingly notified of this in step 60 while power to the server 2 is maintained. This permits the operator of the data center 100 to investigate the error that is affecting the server 2 and to continue the shutdown process in the least destructive manner.

Figure 3:
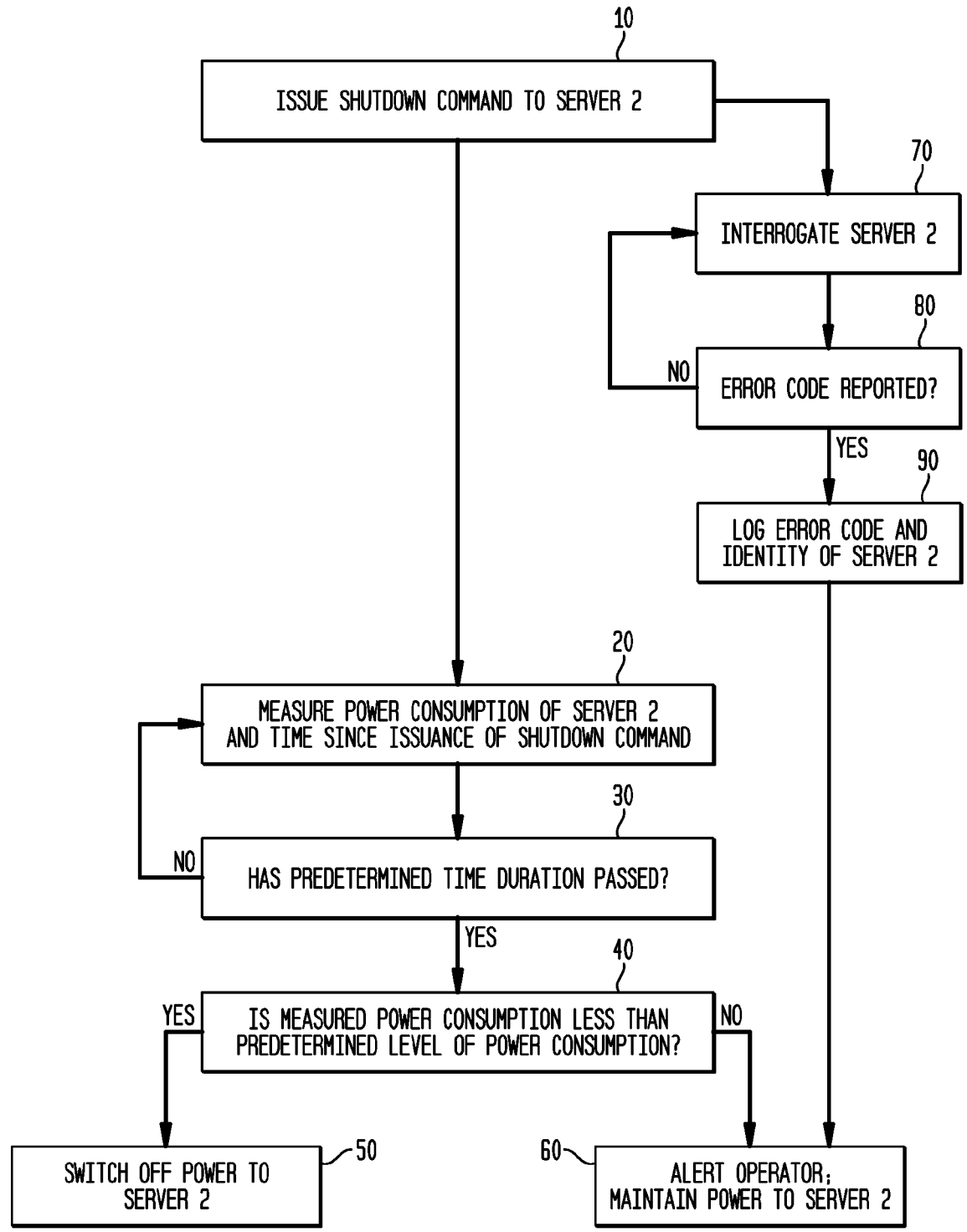
FIG. 3 is a flow chart of an alternate preferred embodiment of a method in accordance with the invention.

In accordance with a second preferred embodiment of the invention (FIG. 3), the step 10 issuance of a shutdown command to the server 2 initiates an interrogation step 70. The purpose of the interrogation step 70 is to determine (step 80) whether the server 2 generates any error codes in response to the shutdown command. (For example, if an authentication error occurs, the server 2 will issue an error code indicating this.) If so, the error code is logged (step 90) to facilitate subsequent investigation and repair. If no error codes have been generated, the system operates as before to determine whether the server 2 has indeed shut down gracefully, and if so the power to the server 2 is turned off in step 50. But, if the step 80 decision does not confirm that the server 2 has shut down gracefully, power to the server 2 is maintained and the operator of the data center 100 is notified in step 60, permitting further investigation while power to the server 2 is maintained.

Advantageously, the interrogation step 70 includes the repeated issuance of a ping command and the reception of acknowledgements to it. If acknowledgement of the ping command ceases at an appropriate time, this is consistent with an assumption that the server 2 has been gracefully shut down and this assumption can be confirmed by carrying out the steps 20-60. But if the server 2 continues to acknowledge ping commands for too long during the shutdown period, this indicates that a malfunction has occurred and the power to the server is maintained.

Figure 4:
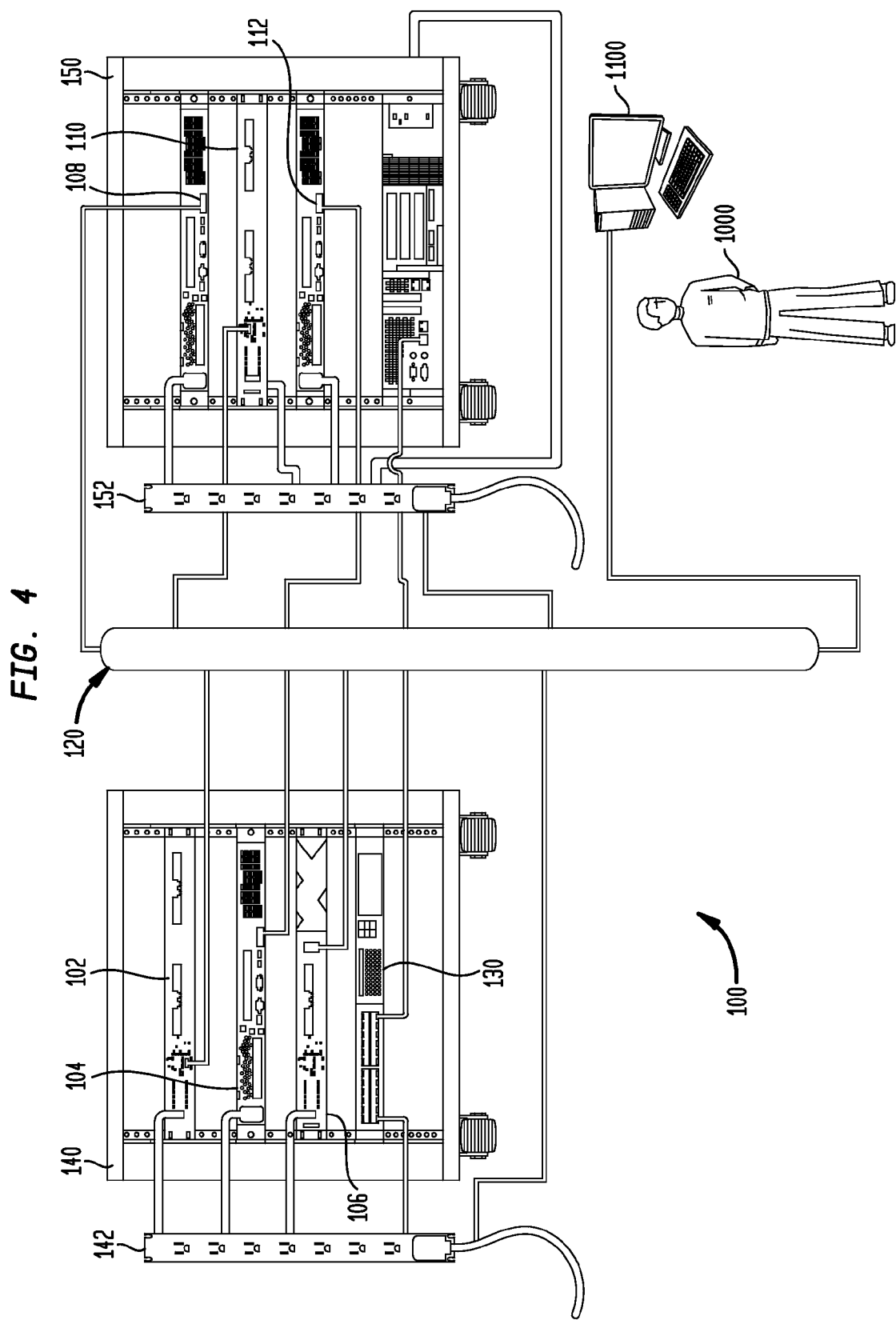
FIG. 4 is a schematic illustration of a preferred embodiment of apparatus in accordance with the invention.

Apparatus in accordance with a preferred embodiment of the invention is schematically illustrated in FIG. 4. As shown there, the data center 100 has WINDOWS servers 102, 104 and 106 (all mounted in rack 140) and UNIX servers 108, 110 and 112 (all mounted in rack 150). (The types of servers used—here, WINDOWS and UNIX—is exemplary and not a part of the invention. Other server types—e.g. Linux, Solaris, HP-UX—can also be used.) The WINDOWS servers 102, 104, and 106 and a power monitoring appliance 130 (described in more detail below) are all supplied with power by a PDU 142 that is mounted to the rack 140. The PDU 142 has outlet-level power monitoring and switching capability and can therefore individually measure and report the power consumption of each of the servers 102, 104, and 106 and the appliance 130, and it also has the ability to switch power on and off to individual ones of the servers 102-104 in response to commands. PDUs suitable for this application are models in the PX-5000 series manufactured by Raritan Inc. Similarly, a second PDU 152 supplies power to servers 108, 110 and 112. The PDU 152 may be (but need not be) the same as the PDU 142, but like PDU 142 it has outlet-level power monitoring and switching capability.

A local area network (LAN) 120 connects servers 102-112, to each other and to the power monitoring appliance 130. The primary function of the LAN 120 is to parcel out computing tasks to the servers 102-112 and to make the results of such tasks available to one or more users (not shown), but in this embodiment the LAN 120 also supports the operation of the PDUs 142 and 152 by conveying individual power consumptions of the servers 102-112 to the power monitoring appliance 130 and commands from the power monitoring appliance 130 to switch individual servers 102-112 on and off. For this reason, the LAN 120 is referred to as an "in-band" network. Typically, the LAN 120 will be an Ethernet network, but it may alternatively be a wireless network using conventional protocols (e.g. SNMP, MOD bus, IPMI, and TCP/IP). As stated above, the details of the network are not part of the invention.

The power monitoring appliance 130 runs a power monitoring program that carries out a method in accordance with the invention. Once such program is the POWER IQ program manufactured by Raritan Inc. This program can monitor the power consumption of as many as 40,000 servers and present power usage information to a human operator 1000 via a web browser on a terminal 1100 so that the operator 1000 can decide which server(s) can be shut down. The program can also issue appropriate shutdown commands to individual servers either as a result of operator decision or automatically. (One example of an automatic issuance of a shutdown command is: "Shut down server X at 2:00 am".)

In practice, the operator 1000 of the data center 100 loads the POWER IQ program with data that identify each of the servers 102-112 (i.e. that specify what type—WINDOWS, UNIX of server each server is, what the network address of the server is, what types of credentials are needed to address the server etc.) together with any other information (e.g. the maximum time duration required for the server to execute a graceful shutdown after receiving a shutdown command, the power consumption of the server after it has shut down gracefully) needed to cause that server to boot up and to shut down.

Then, as stated above, when an individual one (or a predefined group) of the servers 102-112 is to be shut down, the power monitoring appliance 130 issues (automatically, or at the instance of the operator 1000) an appropriate shutdown command to the LAN 120, which routes the command to the server or server group that is to be shut down. Upon that issuance, one or more software timers in the POWER IQ program are loaded with the maximum time(s) required for the server or servers to execute a graceful shutdown, and started. After the timer(s) have counted down, the POWER IQ program compares the power consumed by that server or each of the servers in the group as reported by the appropriate PDUs 142, 152 with the appropriate predetermined level(s) of power consumption. (Optionally, the server(s) can be interrogated as set forth above.) In the end, the POWER IQ program will either switch the appropriate server(s) off by issuing appropriate command(s) to the appropriate PDUs 142, 152, or will advise the operator 1000 (by appropriate display on the terminal 1100) that server(s) have hung or otherwise malfunctioned so corrective steps can be taken.

Figure 5:
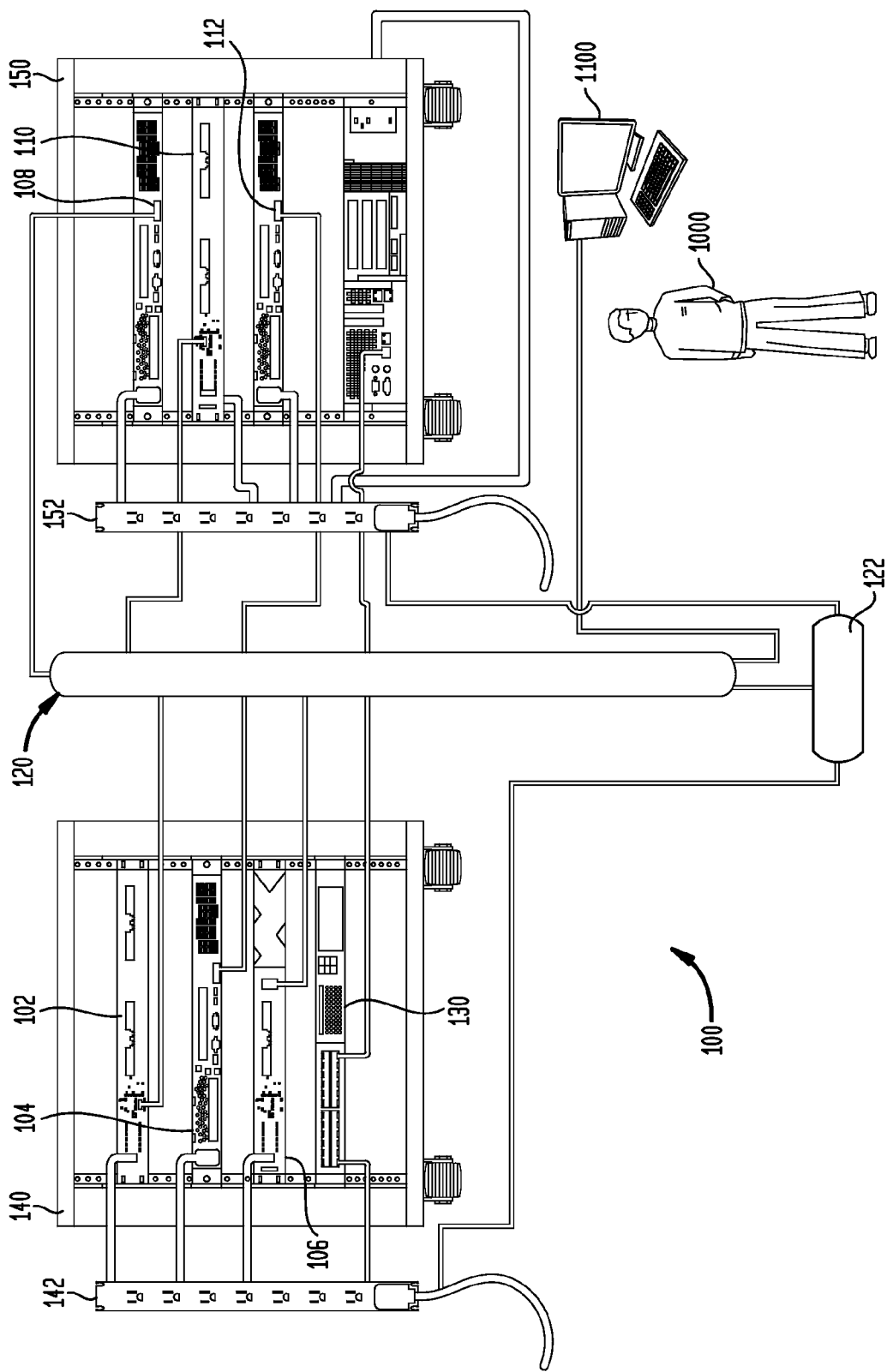
FIG. 5 is a schematic illustration of an alternate preferred embodiment of apparatus in accordance with the invention.

The alternate embodiment shown in FIG. 5 is highly similar to the FIG. 4 embodiment, but in this embodiment the power management information (power consumption of the various servers, commands to switch the servers on and off) travels on a separate LAN 122. This is known as an "out-of-band" solution. It has the advantage of being more robust than an in-band implementation, but has the disadvantage of being more expensive to install and to maintain.

In the foregoing description, the power monitoring appliance 130 is illustrated as dedicated hardware on which the POWER IQ program resides. This is not necessary; the power monitoring appliance 130 may be implemented as a virtual appliance on the LAN 120, the LAN 122, or both.

Although at least one preferred embodiment has been described above, this description is not limiting and is only exemplary. The scope of the invention is defined only by the following claims.

The invention claimed is:

1. A method for identifying whether a server has shut down gracefully after issuance to it of a shutdown command, comprising the following steps:
   predetermining a non-zero level of power consumption below which the server is considered to have been gracefully shut down;
   predetermining a maximum time duration required for the server to shut down gracefully after receiving a shutdown command;
   monitoring the power consumption of the server;
   monitoring the time elapsed since issuance of the shutdown command; and
   comparing the power consumption of the server to the predetermined non-zero power consumption level immediately after the predetermined time duration has taken place.

2. The method of claim 1, further comprising the step of interrogating the server to determine its status, said interrogating step following receipt of said shutdown command.

3. The method of claim 2, wherein said interrogating step comprises the step of issuing a ping command to the server.

4. Apparatus for identifying whether a server has shut down gracefully after issuance to it of a shutdown command, comprising:
   means for monitoring the power consumption of the server;
   means for detecting the issuance to the server of a shutdown command; and
   means for comparing, after a predetermined time duration required for the server to shut down gracefully after receiving a shutdown command, the power consumption of the server with a predetermined level of power consumption below which the server is considered to have been shut down gracefully.

5. The apparatus of claim 4, further comprising means for interrogating the server to determine its status.

6. The apparatus of claim 4, further comprising means for shutting off power to a server that has, after said predetermined time duration, a power consumption at most equal to said predetermined level of power consumption.

7. The apparatus of claim 6, wherein said means for monitoring and said means for shutting off power comprise a power distribution unit having outlet-level power monitoring and switching capability.

8. The apparatus of claim 4, wherein said means for monitoring comprises a power distribution unit having outlet-level power monitoring and switching capability.

9. A power monitoring system for use with a plurality of servers, the system identifying a server that has failed to shut down gracefully after issuance to it of a shutdown command and thereby permitting an operator to take appropriate action with respect to such identified server, the system comprising:
   means for monitoring the power consumption of each server;
   means for detecting the issuance of a shutdown command to a server; and means for comparing, after a predetermined time duration required for a server to shut down gracefully after receiving a shutdown command, the power consumption of the server that has been issued a shutdown command with a predetermined level of power consumption below which the server is considered to have been shut down; and means for identifying, to an operator, a server that has been issued a shutdown command and that has a power consumption exceeding such predetermined level of power consumption.

10. The system of claim 9, wherein said means for monitoring includes at least one power distribution unit, all such power distribution units having outlet-level power monitoring and switching capability.

11. The system of claim 10, wherein all such power distribution units are connected to an in-band network.

12. The system of claim 10, wherein all such power distribution units are connected to an out-of-band network.

* * * * *